United States Patent

Andrä et al.

[11] Patent Number: 5,058,267
[45] Date of Patent: Oct. 22, 1991

[54] PROCESS OF PRODUCING A TORSIONAL VIBRATION DAMPER WITH A LOOSELY EMBEDDED GUIDING RING

[75] Inventors: Rainer Andrä, Limburg; Günter Engemann, Rimbach, both of Fed. Rep. of Germany

[73] Assignee: Firma Carl Freudenberg, Weinheim/Bergstr., Fed. Rep. of Germany

[21] Appl. No.: 417,723

[22] Filed: Oct. 5, 1989

Related U.S. Application Data

[63] Continuation of Ser. No. 50,235, May 15, 1987, abandoned.

[30] Foreign Application Priority Data

Nov. 7, 1986 [DE] Fed. Rep. of Germany ....... 3638097

[51] Int. Cl.$^5$ .............................................. B23P 11/02
[52] U.S. Cl. .................. 29/897.2; 29/898.02; 29/434; 29/436; 29/447; 29/450; 74/574
[58] Field of Search ................ 29/897.2, 898.02, 434, 29/436, 447, 450, 451

[56] References Cited

U.S. PATENT DOCUMENTS

| | | | |
|---|---|---|---|
| 2,636,399 | 4/1953 | O'Connor | 74/574 |
| 3,262,334 | 7/1966 | Edwards | 74/574 |
| 3,373,633 | 3/1968 | Desmond et al. | 74/574 |
| 3,410,369 | 11/1968 | Ishizuka | 74/574 |
| 3,448,830 | 6/1969 | Desmond | 74/574 X |
| 3,552,230 | 1/1971 | McLean | 74/574 |
| 3,771,380 | 11/1973 | Bahr et al. | 74/574 |
| 4,150,587 | 4/1979 | Bremer, Jr. | 464/89 X |
| 4,302,986 | 12/1981 | Shepherd | 74/574 |
| 4,378,865 | 4/1983 | McLean | 74/574 X |
| 4,432,254 | 2/1984 | Schultz | 74/574 |
| 4,764,152 | 8/1988 | Jorg et al. | 464/89 |

FOREIGN PATENT DOCUMENTS

| | | | |
|---|---|---|---|
| 135646 | 4/1985 | European Pat. Off. | |
| 2151366 | 4/1973 | Fed. Rep. of Germany | 74/573 F |
| 2418831 | 10/1975 | Fed. Rep. of Germany | 464/28 |
| 26407 | 5/1978 | Fed. Rep. of Germany | |
| 2831076 | 1/1980 | Fed. Rep. of Germany | 74/574 |
| 3535859 | 4/1987 | Fed. Rep. of Germany | 74/574 |
| 1029381 | 6/1953 | France | 464/89 |
| 50245 | 3/1984 | Japan | 74/573 F |
| 377 | of 1867 | United Kingdom | 74/574 |
| 759215 | 10/1956 | United Kingdom | 464/89 |
| 847505 | 9/1960 | United Kingdom | 464/89 |
| 1504998 | 3/1978 | United Kingdom | 74/573 F |

*Primary Examiner*—P. W. Echols
*Assistant Examiner*—David P. Bryant
*Attorney, Agent, or Firm*—Felfe & Lynch

[57] ABSTRACT

A process of producing a torsional vibration damper, in which a flywheel ring is supported on a hub ring by means of a rubber-elastic body of annular configuration which is vulcanized to both ring surfaces. The elastic body contains a loosely embedded guiding ring which improves the radial and axial guidance of the flywheel ring.

11 Claims, 4 Drawing Sheets

PROCESS OF PRODUCING A TORSIONAL VIBRATION DAMPER WITH A LOOSELY EMBEDDED GUIDING RING

This is a continuation application of application Ser. No. 050,235, filed May 15, 1987, now abandoned.

BACKGROUND OF THE INVENTION

The invention relates to a torsional vibration damper of the type which comprises a hub ring, a flywheel ring coaxially surrounding the hub ring, an annular elastic body deposed in an annular gap between the hub ring and the flywheel ring, and a guiding ring enclosed within the elastic body to provide radial and axial guidance of the flywheel ring.

A torsional vibration damper of this type is disclosed in the German patent No. 26 40 752. The guiding ring is formed in this case by radially extending inserts which, for production reasons, are closed up in a band extending circumferentially. This band is fixedly bonded into the elastic body. To prevent stiffening due to deformation by thrust forces in the circumferential direction, the axially disposed creases in the band are weakened and/or they are in the form of scoring lines which break apart during operation. The knife-like fractured edges thus created can consequently result in damage to the elastic body when the torsional vibration damper has been in operation for some period of time, resulting not only in a reduction of the useful life of the torsional vibration damper but also in the impairment of the radial guidance provided by the flywheel ring. Furthermore, the manufacture and rotationally symmetrical embedding of the wavy band in the elastic body consisting of rubber-elastic material is complicated and expensive.

It is the principal objective of the invention, therefore, to devise a torsional vibration damper that will be easy to manufacture, and in which a precise relationship between the flywheel ring and the hub ring will be assured in both the axial and in the radial direction. The torsional vibration damper is to be easily suited for long-term operation and is to have precisely defined damping properties which will undergo no appreciable change throughout its entire life.

SUMMARY OF THE INVENTION

This objective is achieved, in accordance with the present invention, in a torsional vibration damper of the type described above by loosely embedding the guiding ring in the elastic body so as to permit free movement between the guiding ring and the elastic body.

The guiding ring loosely embedded in the elastic body of the torsional vibration damper according to the invention may be of simple and sturdy construction, permitting easy installation in the elastic body during production. The guiding ring can be obtained commercially in already-manufactured form or by cutting it to length from a semifinished material, depending on the model. Ring elements of similar form have found many kinds of uses in the past in areas unrelated to the present invention. Even the procurement of guiding rings with specific properties generally presents no difficulty, such as the procurement of models which have a surface treated to reduce friction, or which consist of a material having a particularly high linear coefficient of thermal expansion. The properties of the torsional vibration damper according to the invention can thus be very easily modified and adapted to the special requirements of the application. Nevertheless, uniform properties in each unit produced can be assured even in mass production.

To prevent dirt from getting into the area of the relatively moving surfaces of the guiding ring and elastic body it has proven to be advantageous for the profile of the guiding ring to be surrounded on all sides by impermeable parts of the elastic body. The technical characteristics of the new torsion vibration damper will thus be long preserved even in an extremely dirty environment. Especially when the torsional vibration damper according to the invention is used in the drive train of a motor vehicle, this advantage is of great importance.

To obtain good radial and axial guidance of the flywheel ring on the hub ring, the use of a single guiding ring of rectangular profile will suffice in simple cases. This ring can be pressed onto the hub ring thus producing a radial bias. This bias assures a rotationally symmetrical relationship to the axis of rotation and thereafter makes it easy to prevent imbalance of the flywheel ring guided by the guiding ring.

The use of guiding rings having a different profile, especially a circularly defined profile, is also possible, and results in a reduction of weight combined with satisfactory performance of the finished torsional vibration damper. Additional improvements can be achieved by providing cavities in the guiding ring. However, they necessitate the use of a material of sufficient strength to maintain the integrity of the guiding ring.

The ratio between the radial dimension of the elastic body and the maximum radial dimension of the guiding ring is preferably about 1.1 to 1.6. In cases in which the guiding ring is of a rotationally symmetrical configuration, there will be no change in regard to the established value on the entire circumference.

In cases in which the radially outwardly and/or radially inwardly facing boundary surfaces of the guiding ring are associated with the radially confronting boundary surfaces of the gap at varying intervals, however, the points of closest approach to the outer and inner boundary surface on the annular gap are to be projected onto a common radial plane and are to be taken as the basis for the determination of the maximum value. A correspondingly close approach of the guiding ring to the flywheel ring and hub ring is to be present at at least three points uniformly distributed around the circumference, while the internal and external approach can, of course, be displaced relative to one another in the circumferential direction.

In the case of torsional vibration dampers of particularly great axial length, it is advantageous to embed an axially divided guiding ring into the elastic body such that the two parts of the guiding ring are at the greatest possible axial distance apart. Even in the case of tilting stress on the torsional vibration damper, an unvarying relationship between the hub ring and the flywheel ring is thus assured.

Any known, rubber-elastic materials can be used in making the elastic body, especially those based on a rubber or polyurethane material. These have a relatively high coefficient of friction with respect to the surfaces of solid bodies, and therefore it is recommended that the surface of the guiding ring be made especially smooth, if necessary, and/or that it be coated with a substance to reduce friction, for the purpose of improving the relative movement.

If a material is used in making the elastic body which is vulcanized by heating, it has proven to be advantageous if a guiding ring is used which is made of a material having a linear coefficient of thermal expansion which corresponds approximately to that of the rubber-elastic material of the elastic body surrounding it. The cooling that takes place after the vulcanization of the rubber-elastic material results in a shrinkage of the material of the elastic body and of the material of the guiding ring, which results in the formation of a gap between the two. The ability of the elastic body to move with respect to the guiding ring is thereby improved. The gap can, if desired, be filled with a liquid for the purpose of setting the relative mobility between the guiding ring and the elastic body to a specific value. The liquid can either be a friction-reducing or a friction-increasing substance, as required.

The guiding ring is made, as a rule, of metal. Plastics are also excellent materials for the guiding ring since they improve the relative mobility of the guiding ring with respect to the elastic body. Polytetrafluoroethylene (known as PTFE or ∓Teflon") or polyamide are particularly preferred.

For a full understanding of the present invention, reference should now be made to the following detailed description of the preferred embodiments of the invention and to the accompanying drawings.

DESCRIPTION OF THE PREFERRED EMBODIMENTS

Figure 1:
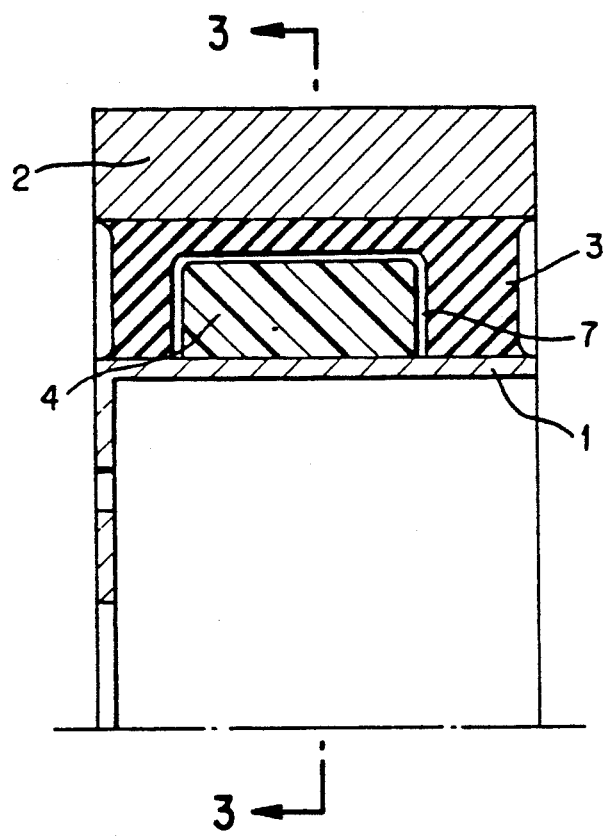
FIG. 1 is an axial cross-sectional view of one half of a torsional vibration damper according to a first preferred embodiment of the present invention, the other half being symmetrical and identical to the portion shown.

The torsional vibration damper shown in FIG. 1 includes a hub ring 1 and a flywheel ring 2 coaxially surrounding the hub ring. The hub ring and flywheel ring, respectively, externally and internally define an annular gap between them. The annular gap contains a rubber-elastic body 3 of annular shape, which is affixed by vulcanization both to the hub ring 1 and to the flywheel ring 2. The elastic body 3 consists of heat-vulcanized rubber. It envelops the rectangular profile of a rotationally symmetrical guiding ring 4 on all sides. The latter consists of polyamide and has a linear coefficient of thermal expansion that exceeds that of the body enveloping the guiding ring. Due to the cooling that takes place after the vulcanization of the elastic body 3, a gap 7 results between the elastic body 3 and the guiding ring 4, which improves the relative mobility in the circumferential direction.

The inner circumference of the guiding ring 4 is fixedly pressed against the outer circumference of the hub ring 1. Its outside is thereby associated concentrically with the axis of rotation of the torsional vibration damper while being relatively simple to install, and this assures a good radial guidance of the flywheel ring 2 and prevents the occurrence of imbalances.

Figure 2:
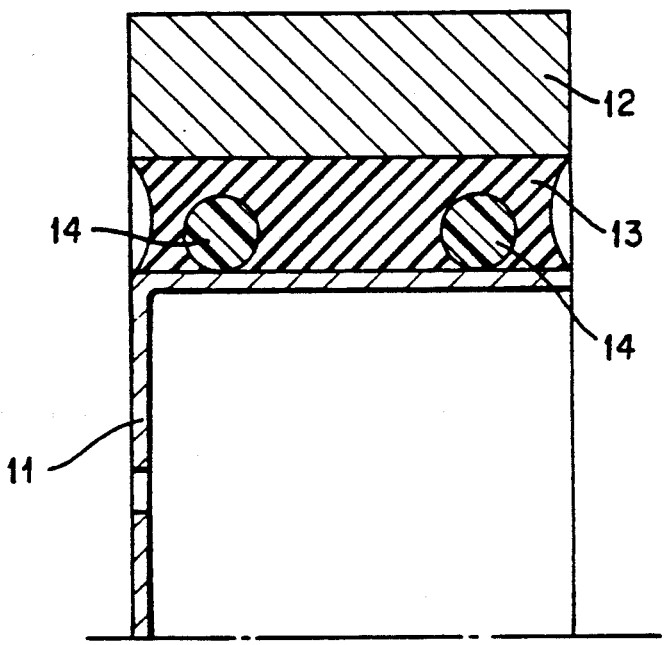
FIG. 2 is an axial, cross-sectional view of one half of a torsional vibration damper according to a second preferred embodiment of the present invention.

In the case of embodiment shown in FIG. 2, the flywheel ring 12 is guided by the hub ring 11 with the aid of two guiding rings 14. The two guiding rings 14 have a circular profile and a rotationally symmetrical shape. They are disposed at the greatest possible axial distance apart on the outside circumference of the hub ring 11. Both are made of polytetrafluoroethylene or "PTFE", which permits excellent relative mobility with respect to the elastic body 13 in the circumferential direction. The elastic body 13 consists again of heat-vulcanized rubber which has a lower coefficient of thermal expansion than the material forming the guiding rings 14.

Figure 3:
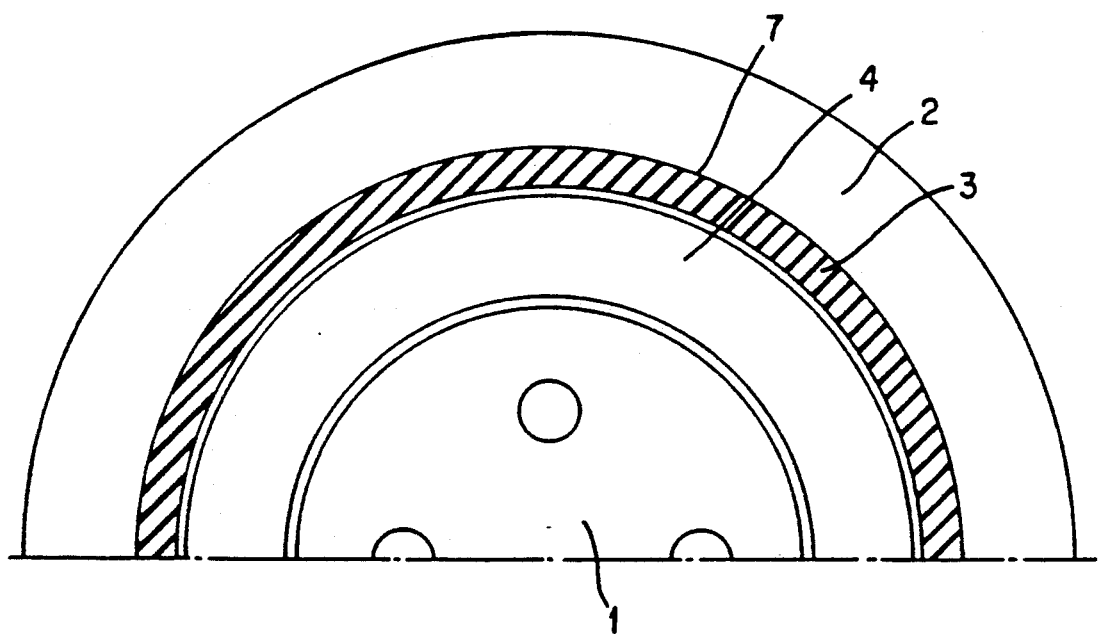
FIG. 3 is an elevational, cross-sectional view of the torsional vibration damper of FIG. 1, taken along the line 3—3 in FIG. 1.
Figure 4:
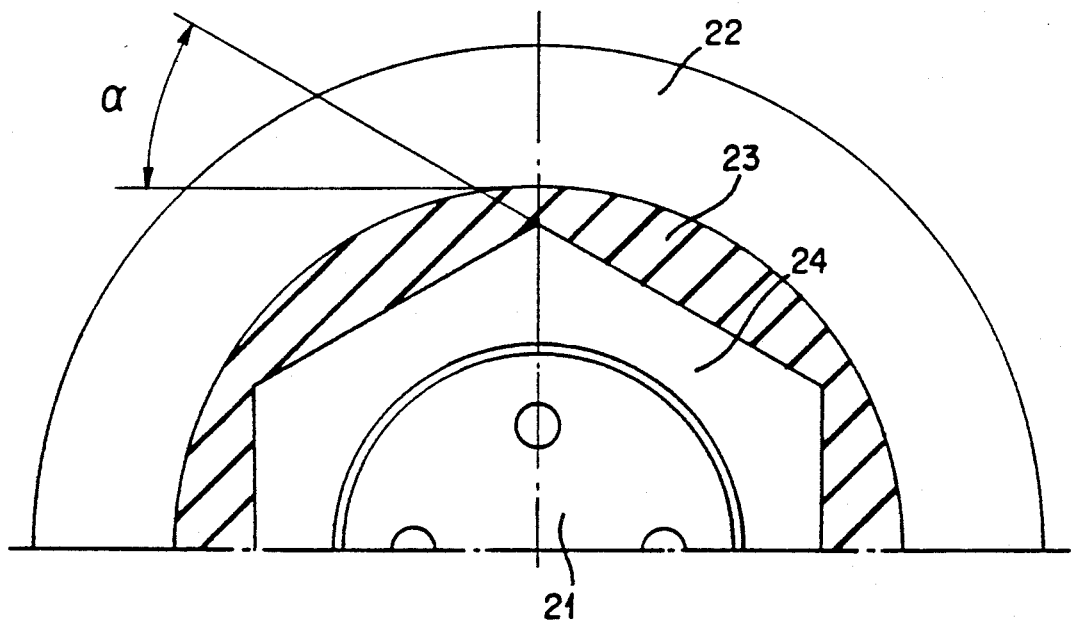
FIG. 4 is an elevational, cross-sectional view of a torsional vibration damper according to a third preferred embodiment of a present invention.

FIG. 3 is a cross-sectional side view of half of the torsional vibration damper of FIG. 1. It is easy to see that the guiding ring 4 is of rotationally symmetrical shape and that the inside of the flywheel ring 2 comes close to it on its entire circumference except for a uniform, very small space. In the area of the space there is only the gap 7 and a narrow web of the elastic body 3. In addition to an improvement of the relative mobility in the circumferential direction, this results in a certain protection of the confronting surfaces of the guiding ring and flywheel ring 2 against mechanical damage.

The hub ring 1 includes a radially extending connection piece of sheet steel which permits the torsional vibration damper to be bolted to a rotating part of a machine.

The embodiments shown in FIGS. 4 to 7 differ from the ones described above in that the guiding ring is not of a rotationally symmetrical construction. In the case of the configurations shown in FIGS. 4, 5 and 7, the inside of the guiding ring is defined by a cylindrical surface which engages the outside of the hub ring 21, 31 and 51, respectively, with resilient bias. Under normal conditions of operation the respective guiding rings 24, 34 and 54 thus undergo no appreciable relative displacement in the circumferential direction.

Externally the guiding rings 24, 34 and 54 are defined by surfaces which are at varying distances from the radially confronting surface of the respective flywheel ring 22, 32 and 52 in portions of the areas distributed around the circumference. In all cases, portions of these areas form with the confronting boundary surface of the outer ring an acute angle $\alpha$. The result is a damping action that progressively increases according to the amplitude of the relative rotation of the hub ring 21, 31 and 51 with respect to the flywheel ring 22, 32 and 52 respectively, which is advantageous in many applications.

Figure 5:
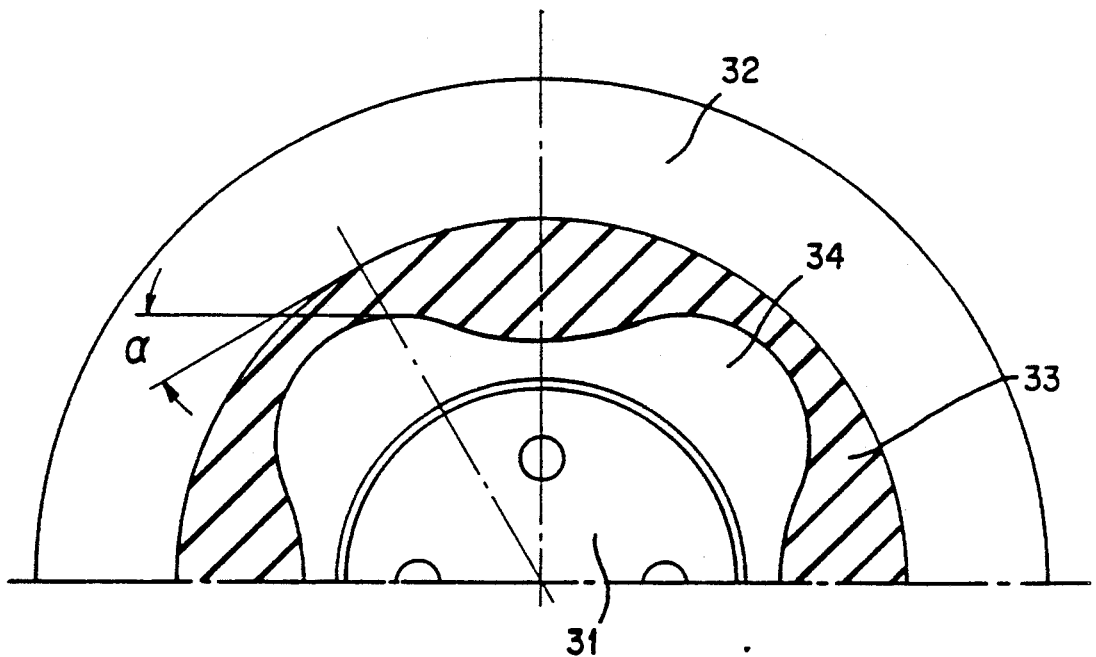
FIG. 5 is an elevational, cross-sectional view of a torsional vibration damper according to a fourth preferred embodiment of the present invention.

The angle $\alpha$ can be varied in the circumferential direction such that adjoining partial areas merge with one another smoothly without abrupt changes in direction. Such an embodiment is shown in FIG. 5, and is especially sturdy from the mechanical point of view.

Figure 6:
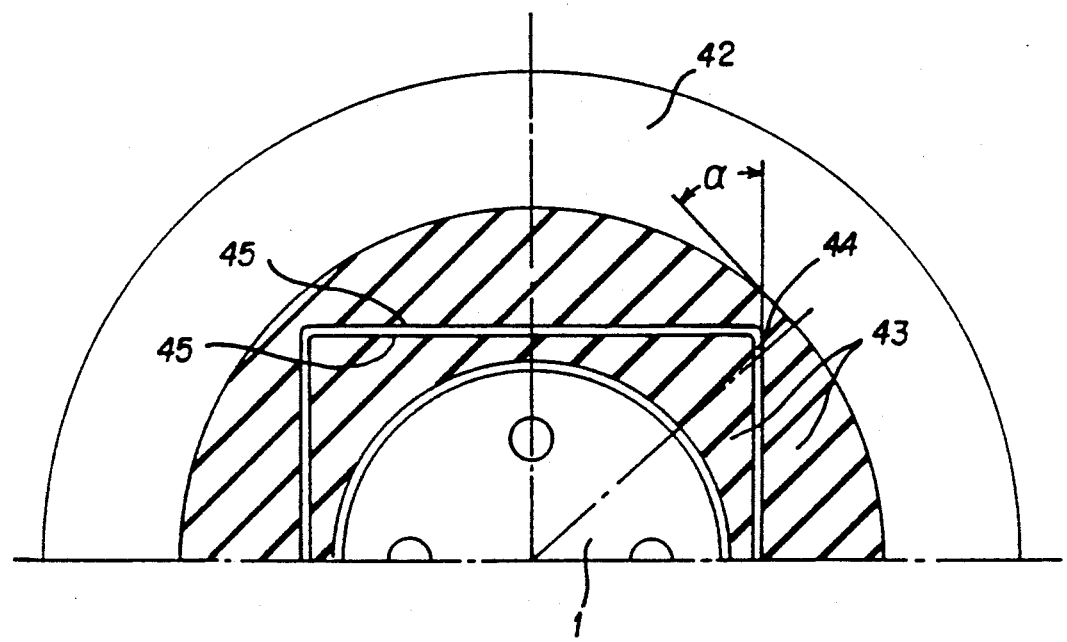
FIG. 6 is an elevational, cross sectional view of a torsional vibration damper according to a fifth preferred embodiment of the present invention.
Figure 7:
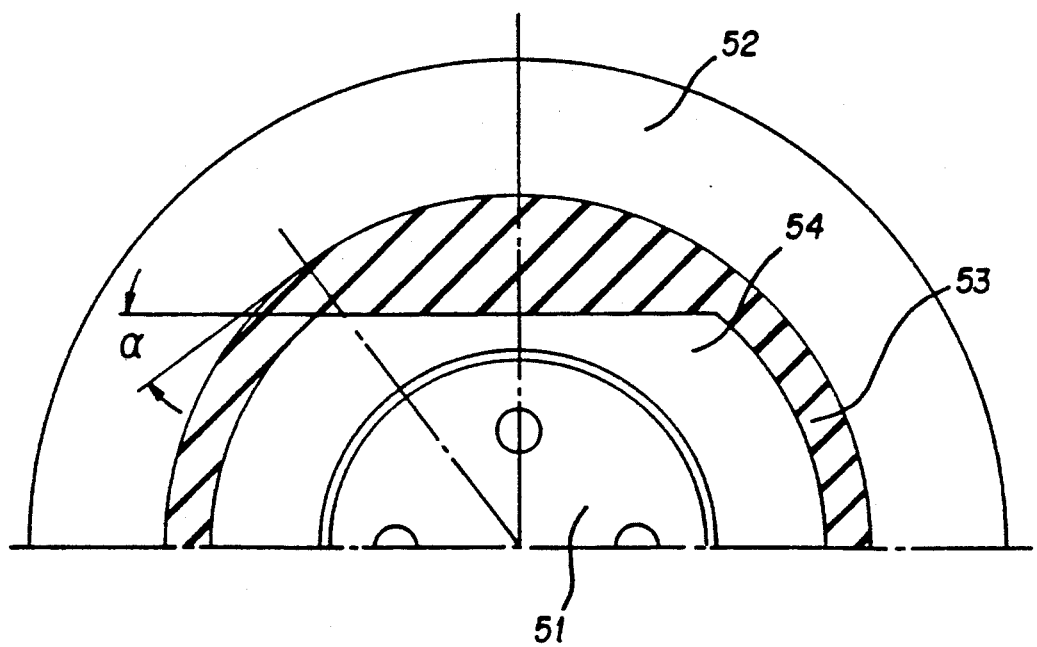
FIG. 7 is an elevational, cross-sectional view of a torsional vibration damper according to a sixth preferred embodiment of the present invention.

In the embodiment shown in FIG. 6, the guiding ring 44 consists of a section of a tube of square profile which, in the portions adjoining one another in the circumferential direction, approach alternately the hub ring 41 and the flywheel ring 42. Such an embodiment is especially simple to manufacture and is of an especially light weight, and achieves an excellent guidance for the flywheel ring 42 on the hub ring 41 in the radial direction, as well as an especially highly progressive resilient characteristic depending on the magnitude of the relative rotation. This embodiment is especially suitable for the damping of rotational vibrations of low amplitude. As regards the association between the bearing surfaces 45 and the radially facing surfaces of the hub ring 41 and flywheel ring 42 but not to the guiding ring 44, respectively, the statements made above are applicable. The resilient body 43 surrounds the guiding ring 444 both on the inside and on the outside. The resilient body is permanently bonded by vulcanization to the hub ring 41 and the flywheel ring 42, but not to the guiding ring 44.

If desired, the gap between the bearing surfaces 45 of the guiding ring 44 and the radially facing surfaces of the elastic body 43, may be filled with a liquid to control the relative mobility between the guiding ring 44 and the elastic body 43. The liquid can either be a friction-reducing or a friction-increasing substance, as required. It may be inserted in the gap by injecting it with a hypodermic needle, or the like, after the guiding ring has been installed within the elastic body.

A typical liquid which may be used to decrease the friction between the guiding ring and the elastic body is a petroleum based oil.

There has thus been shown and described a novel torsional vibration damper which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

We claim:

1. A process of producing a torsional vibration damper, comprising (a) a hub ring; (b) a flywheel ring coaxially surrounding the hub ring, said hub ring and said flywheel ring defining the inside and outside, respectively, of an annular space between them; (c) an elastic body of annular configuration disposed in said annular space and attached to said hub ring and flywheel ring, respectively, said elastic body being made of a heat vulcanizable rubber material; and (d) a separate guiding ring enclosed within said elastic body, said guiding ring being made of a rigid material which does not bond to the elastic body during vulcanization, said process comprising the steps of:

(1) assembling said hub ring, flywheel ring, elastic body and guiding ring in their relative respective positions in the vibration damper;
    (2) heating the assembly to the vulcanization temperature to bond said elastic body to said hub ring and flywheel ring; and
    (3) cooling the assembly to ambient temperature, whereby a gap is formed by shrinkage between said elastic body and said guiding ring.

2. The process of producing a torsional vibration damper according to claim 1, wherein said guiding ring is rotationally symmetrical.

3. The process of producing a torsional vibration damper according to claim 1, wherein said guiding ring has a smooth surface.

4. The process of producing a torsional vibration damper according to claim 3, wherein said smooth surface is coated with a friction-reducing substance.

5. The process of producing a torsional vibration damper according to claim 1, wherein said guiding ring is made of PTFE.

6. The process of producing a torsional vibration damper according to claim 1, wherein said guiding ring is made of polyamide.

7. The process of producing a torsional vibration damper according to claim 1, wherein said gap is filled with a liquid.

8. The process of producing a torsional vibration damper according to claim 1, wherein said guiding ring is made of plastic.

9. The process of producing a torsional vibration according to claim 1, wherein said gap is filled with a friction reducing substance.

10. The process of producing a torsional vibration according to claim 1, wherein said gap is filled with a friction increasing substance.

11. The process of producing a torsional vibration damper according to claim 1 wherein said guiding ring is made of a material having a linear coefficient of thermal expansion which exceeds the linear coefficient of thermal expansion of the material of the elastic body.

* * * * *

UNITED STATES PATENT AND TRADEMARK OFFICE
CERTIFICATE OF CORRECTION

PATENT NO. : 5,058,267

DATED : October 22, 1991

INVENTOR(S) : Rainer Andra et al.

It is certified that error appears in the above-identified patent and that said Letters Patent is hereby corrected as shown below:

Col. 3, line 22, delete "╤ Teflon"" and insert --"Teflon"--.

Col. 5, line 13, delete "but not to the guiding ring 44".

Col. 5, line 15, delete "ring 444" and insert --ring 44--.

Signed and Sealed this

Twenty-ninth Day of June, 1993

Attest:

MICHAEL K. KIRK

Attesting Officer

Acting Commissioner of Patents and Trademarks